3,118,853
COMPOSITIONS COMPRISING A CARBOXYLIC ACID AMIDE INTERPOLYMER AND AN ADDUCT OF A HYDROXYL-CONTAINING POLYMER AND A CARBOXYLIC ACID ANHYDRIDE
Donald P. Hart, Allison Park, and Peter M. Chairge, New Kensington, Pa., assignors to Pittsburgh Plate Glass Company, Pittsburgh, Pa., a corporation of Pennsylvania
No Drawing. Filed June 28, 1960, Ser. No. 39,240
12 Claims. (Cl. 260—45.2)

This invention relates to resinous compositions having many useful properties, and pertains more particularly to resinous blends of (1) an aldehyde-modified unsaturated carboxylic acid amide interpolymer, and (2) an adduct of a hydroxyl-containing polymer and a carboxylic acid anhydride.

In a copending application, Serial No. 749,583, filed July 21, 1958, now U.S. Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde in the presence of an alcohol such as butanol. The resulting resins range from soft, flexible materials to very hard solids, depending upon the choice of monomers utilized in preparing the amide interpolymer which in turn is reacted with the aldehyde and the alcohol.

The resins prepared in accordance with the method described in said copending application, Serial No. 749,583 are useful in coating compositions, laminates, and the like, particularly when blended with one or more other resinous materials such as epoxide resins, vinyl resins, amine resins, alkyd resins, nitrocellulose, polyethylene, and the like. Such resinous blends form films with excellent flexibility, recoat adhesion, and freedom from undesirable color formation, even on overbaking of the film. These films are also outstanding in appearance, gloss, adhesion, mar resistance, color retention, moisture resistance, stain resistance, grease resistance, heat resistance, detergent resistance, and corrosion resistance. Moreover, these outstanding properties are obtained in a single coating of the resinous coating composition on a metallic surface, whereas previous coating compositions have almost without exception required the use of one or more so-called "primer" coats.

The outstanding properties set forth in the foregoing paragraph render the aldehyde-modified amide interpolymer coating compositions useful as finishes for appliances, such as ranges, refrigerators, air conditioners, washers, water heaters, as well as finishes for steel building panels and aluminum siding, and in fact as general industrial finishes on solid surfaces, such as metals, plastics, wallboard, and the like. Such compositions have met with wide commercial acceptance throughout the world.

However, the aldehyde-modified amide interpolymer resins and blends thereof with other resinous materials possess one disadvantage in that coating compositions prepared therefrom should be cured at temperatures of about 350° F. for a period of 30 minutes in order that the outstanding properties set forth hereinabove for such materials will be obatined to the optimum degree. Many industrial finishing installations do not possess oven facilities which can attain temperatures as high as 350° F., and consequently industries having such installations cannot obtain optimum properties from coating compositions containing the aldehyde-modified amide interpolymer resins.

It has now been discovered that the curing temperature of such aldehyde-modified amide interpolymers at which optimum film properties are obtained can be substantially lowered, for example, to as low as about 300° F., and in some instances even as low as 250° F. This desirable result is obtained by blending with the aldehyde-modified amide interpolymer resin (alone or in admixture with another resin such as epoxide resin or vinyl resin) an adduct of a hydroxyl-containing polymer and a carboxylic acid anhydride. By blending only a relatively small quantity of such an adduct with the aldehyde-modified amide interpolymer resin, the temperature at which complete cure of the resin is obtained is decreased, as indicated hereinabove, to temperatures as low as 250° F. or 300° F. (for a 30 minute period). More importantly, however, this decrease in cure temperature is obtained in most instances with no sacrifice in the outstanding properties which such aldehyde-modified amide interpolymer resins impart to coating compositions. In fact, in most instances some of the film properties are actually improved, as will be apparent from the specific examples.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

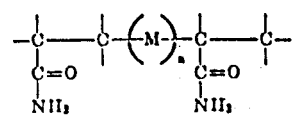

wherein M represents a unit of a monomer polymerizable with acrylamide, and $n$ repersents a whole number greater than 1. For example, if styrene were utilized as the second monomer, M would represent the unit.

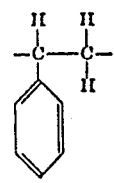

The short chain interpolymer then reacts with an aldehyde, as repersented by formaldehyde, to give the structure

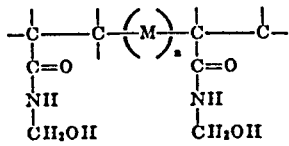

wherein M and n have the significance set forth hereinabove.

In the event the aldehyde is utilized in the form of a solution in butanol or other alkanol, etherification will take place so that at least some of the methylol groups in the above structure will be converted to groups of the structure

—ROR₁ wherein R is a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol such as methanol, ethanol, propanol, pentanol, octanol decanol, and other alkanols containing up to about 20 carbon atoms may also be employed as may aromatic alcohols such as benzyl alcohol, or cyclic alcohols.

While either acrylamide or methacrylamide is prefered for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms such as alpha-chlorostyrene, alpha-bromo-styrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopropene, 2-iodopentene, 4-bromoheptene, 4-chloroheptene, 4-fluoroheptene, cis and trans-1,2-dichloroethylenes, 1,2-dibromomethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene 1-chloro-2,2,2-trifluoroethylene, chlorobutadiene and other halogenated diolefinic compounds.

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl m-chlorobenzoate and similar vinyl halobenzoates vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohlols, 1-buten-4-ol, 2-methyl-buten-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenenitrile, crotonitrile, oleonitrile, and the like;

(5) Acid monomers such as acrylic acid, methacrylic acid, crotonic acid, 3-butenoic acid, angelic acid, tiglic acid, and the like.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosure of which is incorporated herein by reference.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetraamine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid may also be employed, although there is some possibility of gelation occurring if the acid catalyst is too strongly acidic. Alkaline catalysts such as sodium hydroxide, potassium hydroxide, hexamethylenetetraamine, and other basic amines may also be utilized. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the amide with an aldehyde such as formaldehyde to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 775,380, filed November 21, 1958, now U.S. Patent No. 3,079,434, does not require reaction of the polymer with an aldehyde since the N-alkoxyalkyl amide monomers already contain —ROH or —$ROR_1$ groups, wherein R and $R_1$ have the meaning set forth above.

Regardless of the method by which the resinous material is obtained, it will contain in the polymer chain recurrent groups of the structure

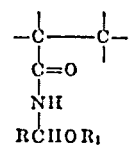

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

As indicated hereinabove, the present invention relates to blends or mixtures of such aldehyde-modified amide interpolymer resins with an adduct of a hydroxyl-containing polymer and a carboxylic acid anhydride. It has been found that any polymeric material containing only a few or many free hydroxyl groups along the polymer chain can be utilized in the formation of such adducts. The following are typical examples of such hydroxyl-containing polymers.

A. Polymers of an unsaturated primary aliphatic alcohol with at least one monomer containing a $CH_2=C<$ group: One particularly useful product of this type is a polymer of allyl alcohol and styrene having the following structure—

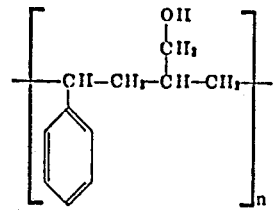

Preferably, the value of $n$ is in the range of about 4 to 10, and several products of this general class are available commercially. In the preparation of such polymers, the allyl alcohol can be replaced by other alcohols containing a polymerizable $CH_2=C<$ group, for example, methallyl alcohol, and the like, with aliphatic unsaturated alcohols containing up to about 10 carbon atoms being particularly useful. The monomeric material which is polymerized with the unsaturated alcohol to form the materials of this class may be selected from the group of polymerizable ethylenically unsaturated monomeric materials set forth hereinabove, with styrene and acrylonitrile being particularly preferred. Another route to this type of polymer is through the hydrogenation of acrolein copolymers.

B. Polyesters prepared by the reaction of polyols with polycarboxylic acids: When polyols such as ethylene glycol, propylene glycol, diethylene glycol, or the like glycols and other polyols containing from about 2 to 12 carbon atoms are reacted, preferably in excess with a dicarboxylic acid (or anhydride) such as adipic acid, succinic acid, maleic acid, fumaric acid, phthalic acid, isophthalic acid, tetrachlorophthalic acid, or other dicarboxylic acids containing up to about 12 carbon atoms, there is obtained a polyester having free hydroxyl groups attached to the polymer chain. Such polyesters may also be reacted with anhydrides of carboxylic acids to form the adducts utilized in preparing the useful compositions of this invention.

C. Polyethers prepared, for example, by the reaction of a polyol such as sucrose, sorbitol, glycerol, or the like containing up to about 10 carbon atoms, with an alkylene oxide such as ethylene oxide, propylene oxide, butylene oxide, or the like, or a mixture of such oxides, can also contain free hydroxyl groups when the polyol component is present in excess. The resulting hydroxyl-containing polyethers may also be reacted with anhydrides and carboxylic acids to form adducts which can be blended with the aldehyde-modified amide interpolymers in accordance with the present invention.

D. Polymers of vinyl alcohol containing recurring units of the structure

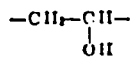

The hydroxyl groups in the polyvinyl alcohol react readily with carboxylic acid anhydrides such as maleic anhydride to form adducts which can be blended with aldehyde-modified amide interpolymers.

E. Hydroxyl-modified vinyl halide polymers: These polymers are preferably copolymers of a vinyl halide such as vinyl chloride or vinyl bromide with a vinyl ester of an aliphatic monocarboxylic acid such as vinyl acetate, vinyl propionate, vinyl butyrate, or the like, which polymers are modified by having hydroxyl groups introduced into the copolymer chain by hydrolysis of at least a portion of the ester linkages in the copolymer structure. Carboxylic acid anhydrides react with such hydroxyl groups to form adducts useful for blending with aldehyde-modified amide interpolymers.

F. Epoxide resins: Many of the epoxide resins are reaction products of epihalohydrins such as epichlorohydrin with dihydric phenols such as bis(4-hydroxyphenyl)2,2-propane. Some of these materials possess hydroxyl groups along the epoxide polymer structure. These hydroxyl groups may also be reacted with carboxylic acid anhydrides to form adducts; however, care must be taken in the reaction to prevent curing of the epoxide resin by the anhydride.

While the above classes of polymers are representative of those which may be employed in forming the compositions of this invention, they by no means represent all of the hydroxy-containing materials which may be used. For example, it is also possible to utilize silicon-containing polymers which possess free hydroxyl groups.

Any dicarboxylic acid anhydride may be reacted with the hydroxyl-containing polymer to form the adducts utilized in combination with the aldehyde-modified amide interpolymer resin. Maleic anhydride is particularly preferred because of its low cost and ready availability; however, other anhydrides such as itaconic anhydride, succinic anhydride, adipic anhydride, and other saturated and unsaturated dicarboxylic acid anhydrides, containing up to about 12 carbon atoms may be used with good results.

In preparing adducts of the free hydroxyl-containing polymers with the dicarboxylic acid anhydrides care should be taken so as to prevent substantial esterification beyond the opening of the anhydride ring. Unless reaction of the carboxyl groups with the hydroxyl groups is minimized, gelation will take place because of the polyfunctional nature of the reactants. In order to prevent this gelation, therefore, the temperature of the reaction should be kept as low as possible, for example, below about 100° C.

One preferred method of carrying out the adduct formation involves admixing the hydroxyl-containing polymer and the dicarboxylic acid anhydride in a solvent and refluxing the resulting solution for a period sufficient to form the desired adduct, ordinarily 5 to 10 hours. While useful products can be obtained when all of the free hydroxyls of the polymer are reacted with the dicarboxylic acid anhydrides, the reaction is preferably carried to a stage where about 20 percent to 80 percent of such hydroxyls are reacted, and it is particularly preferred that the adduct contain about 40 percent to 60 percent of the hydroxyls in unreacted form. The acid number of the adduct solids should ordinarily be in the range of about 20 to 200 and the hydroxyl value in a range of about 40 to 200.

In blending or admixing the adduct with the aldehyde-modified amide interpolymer resin it is ordinarily preferred that the adduct be employed in an amount of about 10 percent to 25 percent by weight on a resin solids basis in order that optimum properties are obtained. However, it is also possible to utilize amounts of the adduct as small as about 2 percent by weight on a resin solids basis, or as high as 50 percent or even higher with good results.

While useful properties are obtained when the adduct is blended with the aldehyde-modified amide interpolymer resin as the sole resinous component in the composition, substantially better results are obtained when one or more other resins are included in the mixture or blend. The preferred resin for this use is an epoxide resin, that is, a resin containing at least one group of the structure

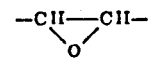

The preferred epoxide resins for blending with the adduct and the aldehyde-modified amide interpolymer resin are the polyglycidyl ethers of polyhydric compounds, particularly the polyglycidyl ethers of bisphenolic compounds. Epoxide resins of this type are disclosed in U.S. Patent 2,870,117 referred to hereinabove. Preferably, the epoxide resin utilized possesses a molecular weight above about 200, and those epoxide resins having a molecular weight in the range of about 700 to 1200 are particularly suitable for use in the compositions of this invention. Ordinarily, the epoxide resin is utilized in an amount as low as about 5 percent by weight to about 40 percent or more by weight based on the solids content of the aldehyde-modified amide interpolymer resin.

In addition to the epoxide resins, other resins which may be utilized in combination with the adduct and the aldehyde-modified amide interpolymer resin include the vinyl resins, particularly polymers of vinyl halides such as vinyl chloride, the alkyd resins, both oil modified and non-oil modified, epoxidized oils, that is, esters of the epoxy fatty acids, preferably containing at least 8 carbon atoms, amine resins such as urea-formaldehyde resins and melamine-formaldehyde resins, nitrocellulose, hydrocarbon resins such as polyethylene and polypropylene, phenolic resins, silicone resins, as well as any other resinous material compatible with the amide interpolymer resin. As is the case with the epoxide resins, these other resins may be utilized in widely varying amounts, for example, from about 5 percent or lower to about 50 percent or higher by weight, based on the resin solids content of the aldehyde-modified amide interpolymer resin.

When the resin mixtures or blends described above are utilized in forming coating compositions, pigments such as titanium dioxide, carbon black, and the like may be added to form any desired color and to enhance the film properties. Other components normally found in coating formulations, such as germicides, fillers, stabilizers, driers, anti-foaming agents, and the like may also be added.

The following examples illustrate in detail the preparation of the resinous compositions of this invention. The examples are not intended to limit the invention, however, for there are, of course, numerous possible variations and modifications.

Examples I to V

These examples illustrate the preparation of aldehyde-modified acrylamide interpolymers which can be blended with adducts of hydroxyl-containing polymers and anhydrides to form the coating compositions of this invention. The polymerization in each example was carried out by mixing the polymerizable components with a chain transfer agent (except in Example V where none was utilized) in a solvent such as butanol or xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan The above components were admixed and refluxed for two hours after which an additional 0.5 part of cumene hydroperoxide was added and reflux continued for a further period of two hours. An additional 0.5 part of cumene hydroperoxide was added and the mixture refluxed for an additional two hours. The resultant interpolymer was then reacted with formaldehyde by adding thereto a solution comprising 0.4 mole of formaldehyde (40 percent concentration in butanol) and about 0.33 part of maleic anhydride. The resulting mixture was refluxed for three hours, after which one-half of the butanol was removed by distillation and replaced by an equal amount of xylene. The resin thus formed had the following properties:

Solids (percent) _____ 48–52
Weight per gallon (pounds) _____ 8.2
Viscosity (Gardner-Holdt) _____ S–X
Color (Gardner) _____ 7 maximum

Example VII

Two hundred six and three-tenths (206.3) pounds of styrene, 37.5 pounds of acrylamide and 6.25 pounds of methacrylic acid were admixed with 2.5 pounds of tertiary dodecyl mercaptan (chain transfer agent), 125 pounds of butanol, 125 pounds of toluene, and 2.5 pounds of cumene hydroperoxide. The resulting mixture was refluxed for two hours after which an additional 1.25 pounds of cumene hydroperoxide was added. Refluxing was then continued for a further period of two hours at which time a final addition of 1.25 pounds of cumene hydroperoxide was made and refluxing continued until a conversion of

| | Example I 15% acrylamide, (A) 25% methyl methacrylate, (B) 60% ethyl acrylate | Example II 20% acrylamide, (A) 20% methyl methacrylate, (B) 60% ethyl acrylate | Example III 15% acrylamide, (A) 25% styrene (B) 60% ethyl acrylate | Example IV 20% acrylamide, (A) 40% styrene (B) 40% butadiene | Example V 20% acrylamide, (A) 80% vinyl toluene |
|---|---|---|---|---|---|
| Polymerization charge and procedure (pounds except where otherwise indicated): | | | | | |
| Acrylamide | 3 | 40 | 3 | 100 | 250. |
| Monomer A | 5 | 40 | 5 | 320 | 1,000. |
| Monomer B | 12 | 120 | 12 | 320 | |
| Catalyst | 90.8 grams C | 2A | 90.8 grams C | 16.0B | 25.0A. |
| | | | 90.8 grams A | | |
| Modifier | 90.8 grams F | 2D | 90.8 grams F | 8.0E | |
| Solvent: | | | | | |
| Butanol | 20.0 | 200 | 20.0 | 1,200 | 1,250. |
| Xylene | | | | 500 | |
| Reflux time (hours) | 4 | 4 | 6 | 16 [1] | 10. |
| Polymer properties: | | | | | |
| Percent solids | 52.5 | 51.6 | 51.5 | 25.1 | 49.1. |
| Viscosity (Gardner) | Z₂ | Z₄–Z₅ | Z | | |
| Formaldehyde condensate, parts: | | | | | |
| Butanol solution of formaldehyde | 6.34 | 84.6 | 6.34 | 339 | 75/351.[3] |
| Maleic anhydride | 36.3 grams | 1.0 | 36.3 grams | 4.5 | 1.0. |
| Reflux time, hours | 3 | 3½ | 3 | 4 | 16. |
| Final Product: | | | | | |
| Percent solids | 50.1 | 48.95 | 50.6 | 49.4 [2] | 41.3. |
| Viscosity (Gardner) | Y | Y | U–V | Z | X–Y. |
| Color (Gardner) | 3–4 | <1 | 3–4 | 3–4 | 1–2. |

[1] In bomb.  [2] Parts resin.  [3] Solids obtained by partial distillation of solvents.

Example VI

An acrylamide interpolymer was prepared from the following components in the amounts set forth:

Parts by weight
Styrene _____ 39
Ethyl acrylate _____ 44
Acrylamide _____ 15
Acrylic acid _____ 2
Butanol _____ 100
Cumene hydroperoxide _____ 1
Tertiary dodecyl mercaptan _____ 1 substantially 100 percent was obtained. The resulting product was then admixed with 79.4 pounds of a 40 percent solution of formaldehyde in butanol and 1 pound of maleic anhydride catalyst. The resulting mixture was then refluxed under azeotropic conditions for three hours to remove water of reaction. The resinous product had the following properties:

Solids (percent) _____ 48–52
Weight per gallon (pounds) _____ 8.07
Viscosity (Gardner-Holdt) _____ V–Y
Color (Gardner) _____ Under 7
Acid value _____ 5.5 to 7.5

Examples VIII to XIV inclusive illustrate the preparation of adducts of dicarboxylic acid anhydrides with free hydroxyl-containing polymeric materials.

Example VIII

The following materials were charged into a glass reactor equipped with stirrer, condenser and temperature measuring means:

| | Parts by weight |
|---|---|
| Allyl alcohol-styrene copolymer (Shell X-450), OH equivalent per 100 grams, 0.45; hydroxyl groups per mole, 5.2 | 85.3 |
| Maleic anhydride | 14.7 |
| Methyl ethyl ketone | 33.3 |

The above components were refluxed until the product had an acid value of 60–64 (about 4 to 8 hours). The product was then diluted to 50 percent solids with toluene the resulting resinous product having the following analysis:

| | |
|---|---|
| Solids (percent) | 50 |
| Hydroxyl value | 65.0 |
| Acid value | 42.0 |
| Viscosity (Gardner-Holdt) | E–F |

Example IX

Example VIII was repeated substituting succinic anhydride for the maleic anhydride of the example. The reaction was carried out in such a way as to react the succinic anhydride with about 40 percent of the available hydroxyl groups of the allyl alcohol-styrene copolymer. The resulting product had a Gardner-Holdt viscosity of W and an acid value of 41.0.

Example X

In this example maleic anhydride was reacted with a polyether obtained by the reaction of sucrose with ethylene oxide in an amount such that the maleic anhydride reacted with 40 percent of the available hydroxyl content of the polyether. The polyether utilized had the following properties:

| | |
|---|---|
| Hydroxyl value | 461 |
| Percent solids | 99.1 |
| Percent water | 0.115 |
| Ash content parts/million | 159 |
| Viscosity centipoises | 27,500 |

The reaction was carried out in methyl ethyl ketone, the reaction mixture being refluxed for approximately 4 hours at which time the acid value of the product was 79.5 at a 50 percent solids content. The Gardner-Holdt viscosity was A–, and the hydroxyl value was 110.4.

Example XI

Example VIII was repeated substituting for the styrene-allyl alcohol copolymer therein utilized a styrene-allyl alcohol copolymer having an equivalent weight in the range of 284–314 and a hydroxyl content of 5.4 percent to 6.0 percent. The reaction was carried out so as to react about 40 percent of the hydroxyl groups of the polyol with maleic anhydride. The product had an acid value of 35.2 at 51.8 percent solids, with a Gardner-Holdt viscosity of W and a hydroxyl value of 45.2.

Example XII

One hundred (100) parts by weight of an interpolymer containing 19 percent allyl alcohol, 48.5 percent styrene, and 32.5 percent acrylonitrile was refluxed with 13 parts by weight of maleic anhydride in 114 parts by weight of methyl ethyl ketone. The reflux was carried out for approximately 5 hours, the resulting product having an acid value of 59.4 at a 50 percent solids content, and a Gardner-Holdt viscosity of N–O.

Example XIII

A polyglycol (Dow 11–100, a propylene oxide condensate of glycerine having an average molecular weight of 1030) was heated in methyl ethyl ketone at reflux with maleic anhydride. The reaction was carried out such that about 50 percent of the available hydroxyl groups in the polyol were reacted with the maleic anhydride. The resulting product had a Gardner-Holdt viscosity of A, an acid value of 45.9, and a hydroxyl value of 95.

This example was repeated using a polyglycol (Dow 11–300) having a molecular weight of about 4000. When diluted to a solids content of 50.9 percent solids with toluene, the product had a Gardner-Holdt viscosity of A, an acid value of 12.48 and a hydroxyl value of 23.85.

Example XIV

Maleic anhydride was reacted with a polyester prepared by the reaction of 2 moles of adipic acid, 1 mole of diethylene glycol and 2.2 moles of trimethylolpropane. This polyester had an acid value of 1.5 and a hydroxyl value in the range of 350–400. The polyester was dissolved in methyl ethyl ketone and enough maleic anhydride added to react with about 40 percent of the hydroxyl groups of the polyester. The mixture was refluxed until the resulting adduct had an acid value of 97.8 at 73.6 percent solids and a Gardner-Holdt viscosity of O.

Example XV

In accordance with this example, the acrylamide interpolymer of Example VI (together with 10 percent by weight on a solids basis of an epoxy resin, Epon 1001) was blended with each of the adducts described in Examples VIII to XIV inclusive and a white appliance type enamel prepared from each of the blends.

In the preparation of the white enamel, the same resin paste was utilized in each instance. This paste was prepared by admixing 2250 parts by weight of rutile titanium dioxide, 450 parts by weight of xylol and 216 parts by weight of the amide resin of Example VI. The resulting mixture was then ground together in a pebble mill for a period of 16 hours, after which an additional 600 parts by weight of the resin of Example VI was added and milling continued for an additional 1½ hours. Three hundred and fifty-one and six-tenths (351.6) parts by weight portions of the paste thus prepared were then admixed with 15 percent by weight, on a resin solids basis, of each of the adducts of Examples VIII to XIV inclusive. To each of these mixtures 2 parts by weight of a 2 percent solution of a silicone oil (Linde X–12) in xylol was added as an anti-flooding agent, together with 10 parts by weight of a pine oil. Each of the resulting enamels was then sprayed on metal panels pretreated with a phosphate solution (Bonderite 1000) to a dry film thickness of 1.5 mils and the resulting films baked for 30 minutes at 300° F. As controls similar panels were sprayed, also to a 1.5 mils dry film thickness, with an enamel formulated in a manner identical to those described above, except that the amide interpolymer resin of Example VI together with the epoxide resin constituted the sole film forming components of the enamel; that is, no adduct was present. One of these panels was baked for 30 minutes at 350° F., and the second for 30 minutes at 300° F. All of the panels thus obtained were then compared for solvent resistance, detergent resistance, salt spray resistance, stain resistance to mustard, ink, lipstick and merthiolate, pencil hardness, impact and flexibility. The results of this comparison are set forth in the following table:

| Adduct description | Cure, time and temp. (min. and (°F.) | Pencil hardness | Impact resistance (in./lbs.) | Flexibility (percent) | Solvent resistance | | Detergent resistance, percent blistering | Salt spray resistance, in. loss of adhesion | Stain resistance | | | |
|---|---|---|---|---|---|---|---|---|---|---|---|---|
| | | | | | Ethyl alcohol | Xylol | | | Mustard | Ink | Lipstick | Merthiolate |
| None | 30-350 | 3H | 6-12 | 20 | Excellent | Good | 1 | ½₂ | Slight | None | None | Very slight. |
| Do | 30-300 | F | 3-6 | 20 | Good | Fair | 100 | ⁵⁄₃₂ | Heavy | Slight | Medium heavy | Medium heavy. |
| Reaction product of maleic anhydride with styrene-allyl alcohol copolymer (Example VIII). | 30-300 | 3H | 3-6 | 20 | Excellent | Good | ½ | ³⁄₃₂ | Very slight | None | None | Very slight. |
| Reaction product of succinic anhydride with styrene-allyl alcohol copolymer (Example IX). | 30-300 | 4H | 3-6 | 20 | do | Excellent | 100 | ³⁄₃₂ | Heavy | Slight | Slight | Heavy. |
| Reaction product of maleic anhydride with sucrose-ethylene oxide polyether (Example X). | 30-300 | 3H | 6-12 | 20 | do | Fair-Good | 100 | ⁹⁄₃₂ | Slight | Very slight | Very slight | Very slight. |
| Reaction product of maleic anhydride with styrene-allyl alcohol copolymer (Example XI). | 30-300 | 3H | 6 | 20 | do | Excellent | 5 | ⅓₂ | Very slight | None | do | None. |
| Reaction product of maleic anhydride with ethylene oxide condensate of glycerine [Example XIII(A)]. | 30-300 | H | 24+ | 20 | do | Good | 100 | ⁵⁄₃₂ | Heavy | Heavy | Heavy | Heavy. |
| Reaction product of maleic anhydride with ethylene oxide condensate of glycerine [Example XIII(B)]. | 30-300 | F | 24+ | 20 | do | do | 100 | ³⁄₃₂ | do | do | do | Do. |
| Reaction product of maleic anhydride and polyester (Example XIV). | 30-300 | 4H | 12-18 | 20 | do | do | 100 | ⁵⁄₃₂ | Medium heavy | Slight | None | Very slight. |

*Example XVI*

A second series of enamels was prepared, utilizing a paste prepared as in the previous example except that the amide interpolymer resin of Example VII was substituted for the amide interpolymer resin of Example VI. Also, in formulating the enamels utilized in this example, 10 percent by weight, on a resin solids basis, of the adduct was utilized in each instance. Two controls were utilized, in each of which the sole resinous components were the amide interpolymer resin of Example VII and the epoxide resin. Each of the enamels, including the control enamels, was sprayed onto metal panels (pretreated as in Example XV) to a dry film thickness of 1.5 mils and the following properties of the panels compared: Pencil hardness, impact, solvent resistance, detergent resistance, salt spray resistance, and stain resistance to the action of mustard, ink, lipstick and merthiolate. The results of this comparison are tabulated below:

| Adduct description | Cure, time and temp. (min. and °F.) | Pencil hardness | Impact resistance (in./lbs.) | Solvent resistance | | Detergent resistance, percent blistering | Salt spray resistance, in. loss of adhesion | Stain resistance | | | |
|---|---|---|---|---|---|---|---|---|---|---|---|
| | | | | Ethyl alcohol | Xylol | | | Mustard | Ink | Lipstick | Merthiolate |
| None | 30-350 | 5H | 1 | Excellent | Excellent | ¼ | ¹⁄₃₂ | None | None | None | None. |
| Do | 30-300 | 3H | 1 | do | Good | ¼ | ¹⁄₃₂ | Very slight | do | do | Do. |
| Reaction product of maleic anhydride with styrene-allyl alcohol copolymer (Example VIII). | 30-300 | 3H | 1-3 | do | Excellent | ¼ | ¹⁄₃₂ | None | do | do | Do. |
| Reaction product of succinic anhydride with styrene-allyl alcohol copolymer (Example IX). | 30-300 | 3H | | do | do | ¼ | ¹⁄₃₂ | do | do | do | Do. |
| Reaction product of maleic anhydride with sucrose-ethylene oxide polyether (Example X). | 30-300 | 4H | 1 | do | do | 20 | ¹⁄₃₂ | do | do | do | Do. |
| Reaction product of maleic anhydride with styrene-allyl alcohol copolymer (Example XI). | 30-300 | 5H | 3 | do | do | 3 | ¹⁄₃₂ | do | do | do | Do. |
| Reaction product of maleic anhydride with ethylene oxide condensate of glycerine [Example XIII(A)]. | 30-300 | 3H | 3-6 | do | Good | ¼ | ³⁄₃₂ | Very slight | Very slight | Very slight | Very slight. |
| Reaction product of maleic anhydride with ethylene oxide condensate of glycerine [Example XIII(B)]. | 30-300 | H | 1-3 | do | Fair | ¼ | ³⁄₃₂ | Slight | None | do | Do. |
| Reaction product of maleic anhydride and polyester (Example XIV). | 30-300 | 3H | 1-3 | do | do | ¼ | ³⁄₃₂ | None | do | None | None. |

The results set forth in the tables of Examples XV and XVI demonstrate that a number of the adducts utilized to modify the amide interpolymer resin impart to the resulting compositions the property of forming films which when baked at 300° F. for 30 minutes are the full equivalent of or even superior to the properties of the unmodified amide interpolymer resin films when cured for 30 minutes at 350° F. Moreover, the result set forth in the tables indicate that without exception the adducts improved one or more important properties of the films.

*Example XVII*

The acrylamide containing resin of Example VI was formulated into a white enamel formulated as in Example XV except that no epoxy resin was utilized. In formulating the enamel, 15 percent by weight of an adduct of maleic anhydride and a styrene-allyl alcohol copolymer (Example VIII) was utilized. Two controls were utilized, in each of which the sole resinous component was the amide interpolymer resin of Example VI. Each of the enamels, including the two control enamels, was sprayed onto metal panels pretreated (as in Example XV) to a dry film thickness of 1.5 mils and the following properties of the films compared: Pencil hardness, Sward hardness, gloss, flexibility, impact resistance and solvent resistance. The results of this comparison are tabulated below:

| Resinous component | Cure, time and temp. (min. and ° F.) | Pencil hardness | Sward hardness | Gloss (Gardner 60° gloss meter) | Flexibility (percent) | Impact resistance, (in./lbs.) | Solvent resistance | |
|---|---|---|---|---|---|---|---|---|
| | | | | | | | Ethyl alcohol | Xylol |
| Resin of Example VI | 30–350 | 2H | 40 | 85 | 15 | 3 | Good | Good. |
| Resin of Example VI | 30–300 | F | 40 | 85 | 0 | <3 | Poor | Poor. |
| Resin of Example VI plus 15 percent adduct of Example VIII | 30–300 | 4H | 38 | 85 | 12 | 3–6 | Good | Good. |

The above example illustrates that the use of adducts of the hydroxyl-containing polymers with dicarboxylic acid anhydrides promotes the cure of unmodified amide resins as well as those amide interpolymer resins that are modified with other resinous materials such as epoxide resins.

Many modifications of the specific procedures set forth in the above examples can be made without substantially affecting the results obtained. For example, when adducts such as those described in Examples VIII to XIV inclusive are admixed with other of the amide interpolymer resins such as those described hereinabove, the curing temperature can be reduced by at least 50° F. without adversely affecting the film properties. Also, other adducts than those disclosed in Examples VIII to XIV inclusive can be utilized in combination with the amide interpolymer resins with good results. Thus, for example, it is possible to substitute anhydrides such as phthalic anhydride or itaconic acid anhydride, or similar anhydrides for the maleic anhydride and/or succinic anhydride of the examples, and it is also possible to prepare useful adducts in which the percentage of hydroxyls of the hydroxyl-containing polymer is varied substantially from the values reported in the specific examples.

Although specific examples of the invention have been set forth hereinabove, it is not intended to limit the invention thereto, but to include all of the variations and modifications falling within the scope of the appended claims.

We claim:

1. A composition comprising an interpolymer of a polymerizable unsaturated carboxylic acid amide and at least one other monomer containing a $CH_2=C<$ group, said interpolymer being characterized by having amido hydrogen atoms replaced by the structure $$-\overset{R}{\underset{|}{C}}HOR_1$$

wherein R is a member of the class consisting of hydrogen and hydrocarbon radicals, and $R_1$ is a member of the class consisting of hydrogen and alkyl radicals containing from about 1 to 8 carbon atoms, and an ungelled adduct of a polymer containing free hydroxyl groups and an anhydride of a dicarboxylic acid, said adduct being formed by reaction of said anhydride with at least some of said free hydroxyl groups.

2. A composition comprising an interpolymer of acrylamide and at least one other monomer containing a $CH_2=C<$ group, said interpolymer containing from about 2 percent to about 50 percent by weight of acrylamide in polymerized form based upon the total weight of said interpolymer, and being characterized by having amido hydrogen atoms replaced by the structure $-CH_2OR_1$, wherein $R_1$ is a member of the class consisting of hydrogen and alkyl radicals containing from 1 to 8 carbon atoms, and an ungelled adduct resulting from the reaction of an anhydride of an aliphatic dicarboxylic acid with at least some of the free hydroxyl groups of a free hydroxyl-containing polymer.

3. The composition of claim 2 wherein the adduct is an adduct of maleic anhydride and a copolymer of an unsaturated aliphatic alcohol with at least one other $CH_2=C<$ monomer.

4. The composition of claim 3 wherein the copolymer is a copolymer of allyl alcohol and styrene.

5. The composition of claim 4 wherein the interpolymer is an interpolymer of acrylamide, styrene, ethyl acrylate, and a member of the class consisting of acrylic acid and methacrylic acid.

6. The composition of claim 4 wherein the interpolymer is an interpolymer of acrylamide, styrene, and a member of the class consisting of acrylic acid and methacrylic acid.

7. A composition comprising a mixture of an interpolymer of an unsaturated acid amide and at least one other monomer containing a $CH_2=C<$ group, said interpolymer being characterized by having amido hydrogen atoms replaced by the structure $$-\overset{R}{\underset{|}{C}}HOR_1$$

wherein R is a member of the class consisting of hydrogen and hydrocarbon radicals, and $R_1$ is a member of the class consisting of hydrogen and alkyl radicals containing from about 1 to 8 carbon atoms, and at least two other resinous materials, at least one of which is the resinous adduct resulting from the reaction of an anhydride of a dicarboxylic acid with at least some of the free hydroxyl groups of a free hydroxyl-containing polymeric material, and another of which is a resin selected from the class consisting of epoxide resins, vinyl halide resins, amine resins, nitrocellulose, and hydrocarbon resins.

8. The composition of claim 7 wherein the amide interpolymer resin and the resinous adduct are combined with an epoxide resin.

9. A composition comprising a mixture of an interpolymer of acrylamide with at least one other monomer containing a $CH_2=C<$ group, said interpolymer containing from about 2 percent to about 50 percent by weight of acrylamide and being characterized by having amido hydrogen atoms replaced by the structure $-CH_2OR_1$, wherein at least about 50 percent of the $R_1$ groups are alkyl radicals containing from about 1 to about 8 carbon atoms, and the remainder of the $R_1$ groups are hydrogen atoms, and at least two other resinous materials, one of which is the ungelled resinous adduct resulting from the reaction of maleic anhydride with at least some of the free hydroxyl groups of a copolymer of an aliphatic unsaturated alcohol with at least one other $CH_2=C<$ monomer, and another of which is a resinous material selected from the class consisting of epoxide resins, vinyl halide resins, amine resins, nitrocellulose, and hydrocarbon resins.

10. The composition of claim 9 wherein the copolymer is a copolymer of allyl alcohol and styrene, and the amide interpolymer resin and the resinous adduct are combined with an epoxide resin.

11. The composition of claim 10 wherein the interpolymer is an interpolymer of acrylamide, styrene and a member of the class consisting of acrylic acid and methacrylic acid.

12. The composition of claim 10 wherein the interpolymer is an interpolymer of acrylamide, styrene, ethyl acrylate and a member of the class consisting of acrylic acid and methacrylic acid.

References Cited in the file of this patent

UNITED STATES PATENTS

| 2,173,005 | Strain | Sept. 12, 1939 |
| 2,808,383 | Fikentscher et al. | Oct. 1, 1957 |
| 2,970,983 | Newey | Feb. 7, 1961 |

FOREIGN PATENTS

| 467,492 | Great Britain | June 11, 1937 |
| 578,345 | Canada | June 23, 1959 |